United States Patent
Barkan et al.

(10) Patent No.: US 9,537,749 B2
(45) Date of Patent: Jan. 3, 2017

(54) METHOD OF NETWORK CONNECTIVITY ANALYSES AND SYSTEM THEREOF

(71) Applicant: Tufin Software Technologies Ltd., Ramat Gan (IL)

(72) Inventors: Tomer Barkan, Alfei Menashe (IL); Michael Hamelin, Suwanee, GA (US)

(73) Assignee: Tufin Software Technologies Ltd., Ramat Gan (IL)

( * ) Notice: Subject to any disclaimer, the term of this patent is extended or adjusted under 35 U.S.C. 154(b) by 213 days.

(21) Appl. No.: 13/911,467

(22) Filed: Jun. 6, 2013

(65) Prior Publication Data

US 2013/0329599 A1    Dec. 12, 2013

Related U.S. Application Data

(60) Provisional application No. 61/656,070, filed on Jun. 6, 2012.

(51) Int. Cl.

| H04L 12/28 | (2006.01) |
| H04L 12/751 | (2013.01) |
| H04L 12/721 | (2013.01) |
| H04L 12/24 | (2006.01) |

(52) U.S. Cl.
CPC ............ *H04L 45/02* (2013.01); *H04L 41/145* (2013.01); *H04L 45/70* (2013.01); *H04L 41/0853* (2013.01)

(58) Field of Classification Search
None
See application file for complete search history.

(56) References Cited

U.S. PATENT DOCUMENTS

| 5,276,789 A | 1/1994 | Besaw et al. |
| 5,845,124 A | 12/1998 | Berman |
| 6,377,987 B1 | 4/2002 | Kracht |
| 7,035,934 B1 | 4/2006 | Lin |
| 2002/0022952 A1 | 2/2002 | Zager et al. |
| 2003/0037136 A1* | 2/2003 | Labovitz ............ H04L 12/2602 709/224 |

(Continued)

OTHER PUBLICATIONS

Xie, G.G. et al., "On Static Reachability Analysis of IP Networks". 24th Annual Joint Conference of the IEEE Computer and Communications Societies. Proceedings IEEE, INFOCOM 2005, Mar. 13-17, 2005.

*Primary Examiner* — Jianye Wu
*Assistant Examiner* — Jeff Banthrongsack
(74) *Attorney, Agent, or Firm* — Wiggin and Dana LLP; Gregory S. Rosenblatt

(57) ABSTRACT

There are provided network analyzer and method of analyzing connectivity between a source and a destination. The method comprises: upon obtaining a partial topological network model comprising at least one cloud, generating the one or more paths between the source and the destination, specifying the cloud as a source point of the one or more paths if at least one source network address belongs to the cloud address space and specifying the cloud as a destination point of the one or more paths between the source and the destination if at least one destination network address belongs to the cloud address space. The method further comprises discovering at least one on-path cloud, the method further comprising specifying, by the processor, the at least discovered on-path cloud as a router configured to route the cloud traffic in accordance with predefined rules.

9 Claims, 13 Drawing Sheets

(56) References Cited

U.S. PATENT DOCUMENTS

| | | |
|---|---|---|
| 2003/0212908 A1 | 11/2003 | Piesco |
| 2006/0182034 A1* | 8/2006 | Klinker ............... H04L 12/2602 |
| | | 370/238 |
| 2009/0097418 A1* | 4/2009 | Castillo .................. H04L 41/12 |
| | | 370/255 |
| 2009/0313362 A1 | 12/2009 | Duggan |

* cited by examiner

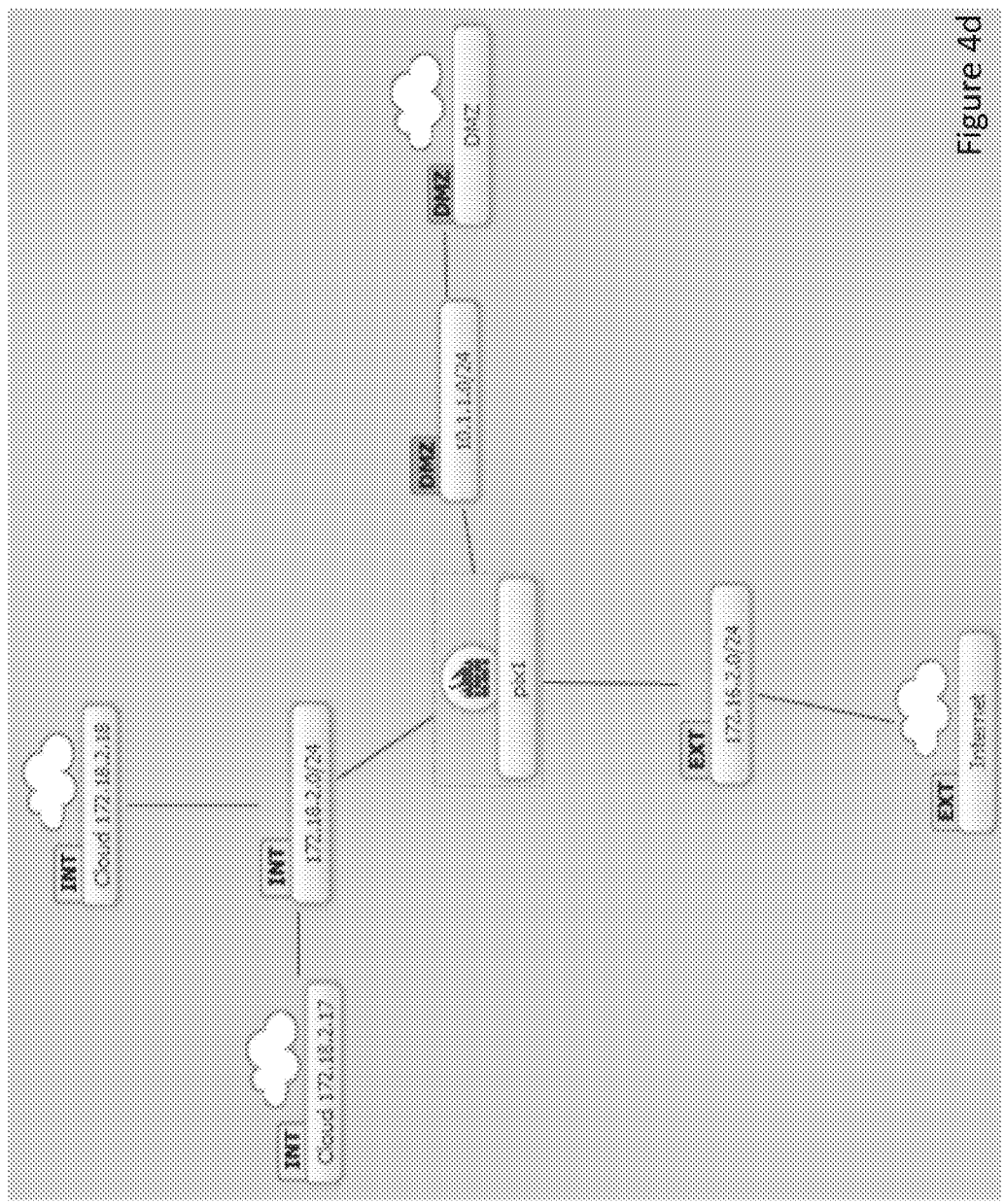

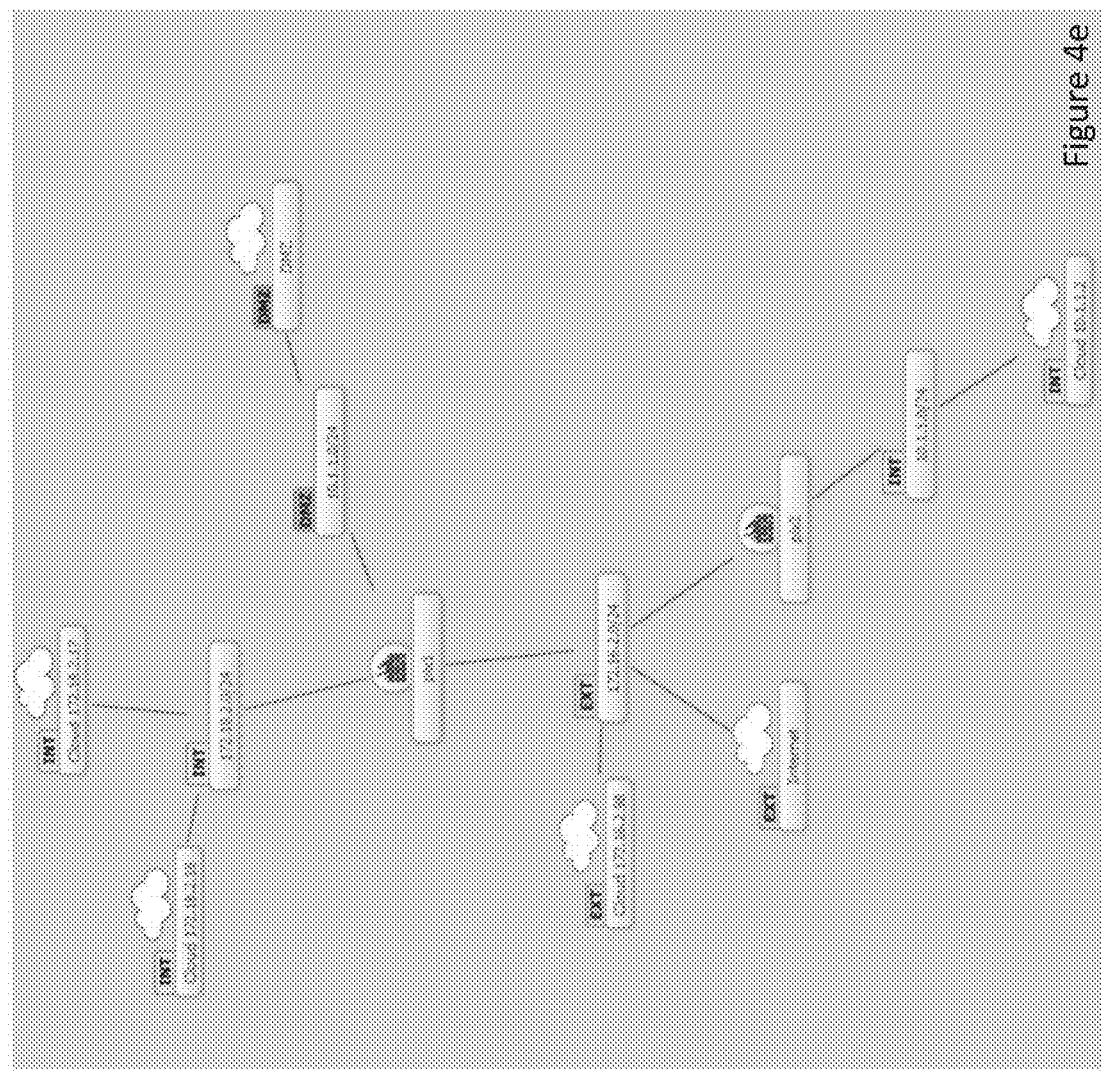

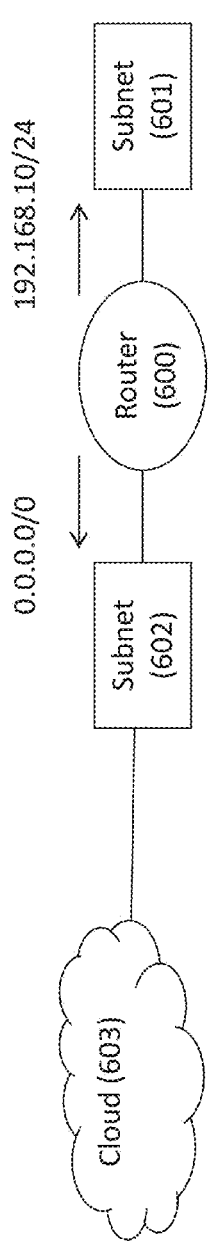
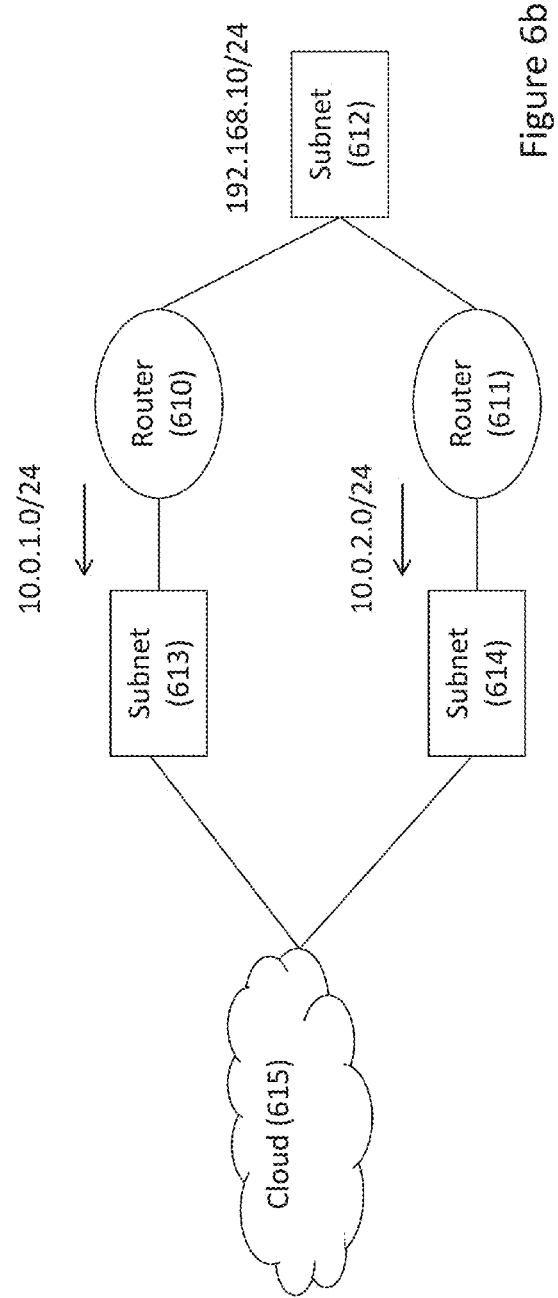

METHOD OF NETWORK CONNECTIVITY ANALYSES AND SYSTEM THEREOF

CROSS-REFERENCE TO RELATED APPLICATIONS

The present application claims benefit from U.S. Provisional Patent Application No. 61/656,070 filed on Jun. 6, 2012; the entire content of this application is hereby incorporated by reference in its entirety.

TECHNICAL FIELD

This invention generally relates to systems and methods of topology network modeling, and more particularly, to systems and methods of network connectivity analyses.

BACKGROUND OF THE INVENTION

To properly maintain a computer network, a network administrator needs to have up-to-date information available about the devices in the network, and how the devices are interconnected. In addition, as the network grows, the network administrator may be required to add new devices to a network or to reconfigure devices in the network. The administrator needs to have a clear understanding of the topology of the network, i.e. the network resources and relationship therebetween on physical and/or logical levels. The network topology can be presented in graphical format allowing different views and levels of the network topology graphs.

A network topology graph can also be used as the basis for automated network management such as diagnosing connectivity problems, designing network connectivity requests, implementing network connectivity requests, verifying network connectivity changes and monitoring network connectivity status.

The problems of topology network modeling and connectivity analyses have been recognized in the conventional art and various systems have been developed to provide a solution, for example:

U.S. Pat. No. 5,276,789 discloses system for automatically laying out and graphically displaying the topology of a computer network system. The layout system retrieves a list of the nodes within the network and their interconnections from a database which can be manually built by a network administrator or automatically constructed by other software. The system will provide any of three views that can be requested by the user. An Internet view is the largest and shows the interconnection of different networks. A network view can be shown for any of the networks described in the Internet view. A network is comprised of segments and the system will display a view of the nodes connected to any one of the segments. The system will automatically update the view as new nodes become available in the database. This aspect of the system and allows the system to dynamically update the graph when the list of nodes is being supplied by other software. The system also allows the user to dynamically alter the graph by using a graphical input device to move any of the objects displayed on the graph.

U.S. Pat. No. 5,845,124 discloses a method of graphically displaying data on a display device of a processing system and a computer system employing the method. The processing system includes a memory for storing tasks, a processing circuit for executing ones of the tasks, and a display device. The display device, which is associated with the processing circuit, is operative to provide a display area that is accessible to executed ones of the tasks. The display area is capable of displaying a symbolic representation of a network model. The memory includes a network modeling task that is retrievable and executable by the processing circuit to create a set of associated data records representing network elements within the network model. The associated data records include multiplicity indicia for providing an abbreviated expression of quantities of the network elements within the network model. The multiplicity indicia simplifying the modeling task and facilitating the display of a symbolic representation of the network model on the display device.

U.S. Pat. No. 6,377,987 discloses a method for determining the actual physical topology of network devices in a network. To determine a physical topology, a discovery mechanism determines a set of network addresses for identifying devices within a network. Based on the set of network addresses, the discovery mechanism identifies a group of devices that are associated with the network. Layer 2 and Layer 3 configuration information is gathered from the group of devices to identify possible neighboring devices within the network. The configuration information is then processed to generate topology information that identifies true neighboring devices and the actual links that exist between each of the neighboring devices. The mechanism eliminates misleading information and prevents generation of incorrect topologies.

U.S. Pat. No. 7,035,934 discloses a system capable to improve a network designer's ability to analyze a data network having several routers. The system accesses static routing information and/or open shortest path first route summarization information, determines an identity of a network prefix using the accessed information, and analyzes the data network using the determined identity. The network designer can use this determined identity for traffic analysis or modeling of the data network.

US Patent Application No. 2002/022952 discloses a method and system for use in administering a complex system, such as a distributed computing ensemble. A model of the system being administered is prepared, preferably during runtime, by a combination of autodiscovery processes and manual input of information as needed. The model represents not only the resources found in the administered system, but also the service-relationships among those resources. The system administrator also can define elements in the model corresponding to arbitrary groupings of already-existing parts of the model. Software agents, which can be reconfigured, started and terminated as desired during runtime, report changes in state of the managed resources to the model, which updates itself and explores portions of the model adjacent (in terms of the service relationships) to the affected resource(s). Clusters of neighboring state-changes that have a logical relation to each other are grouped together as an alarm, and are preferably represented in a graphical display. Any root-cause event of this type is marked as such, and any portions of the modeled system being (or logically likely to be) affected by the changes are also identified and displayed.

US Patent Application No. 2003/212908 discloses a method and system for simulating computer networks and computer network components to test computer network security. A user specifies a desired configuration of a simulated computer network by using a configuration manager. The user also defines all the network components within the simulated computer network by specifying whether a component should be provided in hardware or should be simulated via software. Upon receiving the above-mentioned information from the user, the configuration manager acquires the required hardware resources from a hardware inventory. The configuration manager utilizes an interface switch that connects the hardware in the hardware inventory to produce the desired network layout. Next, the specified configuration for each of the network components is pushed into the acquired hardware resources. Computer network components to be simulated with software are subsequently initialized by the configuration manager. At this point, the user can use the simulated computer network for real-time testing of network security.

US Patent Application No. 2009/097418 discloses systems and methods for network service path analysis. A program running on a computer utilizes a Layer 3 topology of a computer network to create a directed graph representing deliverability of packets across the network. By analyzing access control lists and firewall rule sets from the network, along with modeling routing protocol behavior and policy as packet filters, the program performs a series of matrix multiplications, using an optimized decomposition of the IP packet space. The resulting matrix contains all of the path information for all deliverable packets. The matrix populates a network path database that captures the set of packets deliverable between any pair of Internet Protocol addresses in the network.

US Patent Application No. 2009/313362 discloses a system and associated method for building a network model of a network for a network management application. The network management application discovering a router discovers peering routers using network reachability information in a routing protocol. Undiscoverable peering routers are created within the network model by the network management application from network reachability information. Also a local subnet for the router, a remote subnet for a peer, a remote interface between the router and the peer also may be created to model the network in a network management application from information from the routing protocol.

SUMMARY OF THE INVENTION

In accordance with certain aspects of the presently disclosed subject matter, there is provided a method of analyzing connectivity between a source and a destination characterized, respectively, by one or more source network addresses and one or more destination network addresses. The method can be provided by a network analyzer comprising a processor operatively coupled to a memory. The method comprises: upon obtaining in the memory a partial topological network model comprising at least one cloud comprising at least one unmonitored router, the cloud characterized by a cloud address space and connected to one or more monitored routers, specifying by the processor at least one pair of end points of one or more paths between the source and the destination, wherein the cloud is specified as a source point of the one or more paths if at least one source network address belongs to the cloud address space and the cloud is specified as a destination point of the one or more paths between the source and the destination if at least one destination network address belongs to the cloud address space; and generating by the processor the one or more paths between the specified at least one pair of the end points.

The method can further comprise specifying, by the processor, the at least one discovered on-path cloud as a router configured to route the cloud traffic in accordance with predefined rules if generating the one or more paths comprises discovering at least one on-path cloud. For example, inbound routing to the at least one cloud can be specified in accordance with routing information obtained from monitored routers; and outbound routing from the at least one cloud routes all addresses can be routed into the at least one cloud to all connected monitored routers.

The method can further comprise presenting the generated one or more paths to a user, and enabling the user to select one or more desired paths.

The method can further comprise optimizing the path generation using at least one element of the group constituted by routing precedence; symmetric routing considerations; loop detection; cloud customization using additional routing information.

In accordance with other aspects of the presently disclosed subject matter, there is provided a method of analyzing, by a network analyzer comprising a processor operatively coupled to a memory, connectivity between a source and a destination characterized, respectively, by one or more source network addresses and one or more destination network addresses. The method comprises: upon obtaining in the memory a partial topological network model comprising at least one cloud comprising at least one unmonitored router, the cloud characterized by a cloud address space and connected to one or more monitored routers, generating by the processor the one or more paths between the source and the destination, and specifying by the processor the cloud as a source point of the one or more paths if at least one source network address belongs to the cloud address space and specifying by the processor the cloud as a destination point of the one or more paths between the source and the destination if at least one destination network address belongs to the cloud address space.

The method can start by identifying end points and then generating the one or more paths between them. Alternatively, the method can start by identifying one or more source points, discovering one or more paths and further identifying one or more destination points. Likewise, the method can start by identifying one or more destination points, discovering one or more paths and further identifying one or more source points.

In accordance with other aspects of the presently disclosed subject matter, there is provided a network analyzer capable of analyzing a connectivity between a source and a destination characterized, respectively, by one or more source network addresses and one or more destination network addresses. The network analyzer comprising a processor operatively coupled to a memory. The processor is configured to obtain from the memory a partial topological network model comprising at least one cloud comprising at least one unmonitored router, the cloud characterized by a cloud address space and connected to one or more monitored routers; and specify at least one pair of end points of one or more paths between the source and the destination. The cloud is specified as a source point of the one or more paths if at least one source network address belongs to the cloud address space and the cloud is specified as a destination point of the one or more paths between the source and the destination if at least one destination network address belongs to the cloud address space. The processor is further configured to generate the one or more paths between the at least one pair of the end points.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4a-4e illustrate non-limiting examples of screenshots corresponding to the method detailed with reference to FIG. 3;

FIGS. 6a-6b illustrate non-limiting examples of topology network models related to path generation optimization in accordance with certain embodiments of the presently disclosed subject matter.

DETAILED DESCRIPTION OF EXEMPLARY EMBODIMENTS

Figure 1:
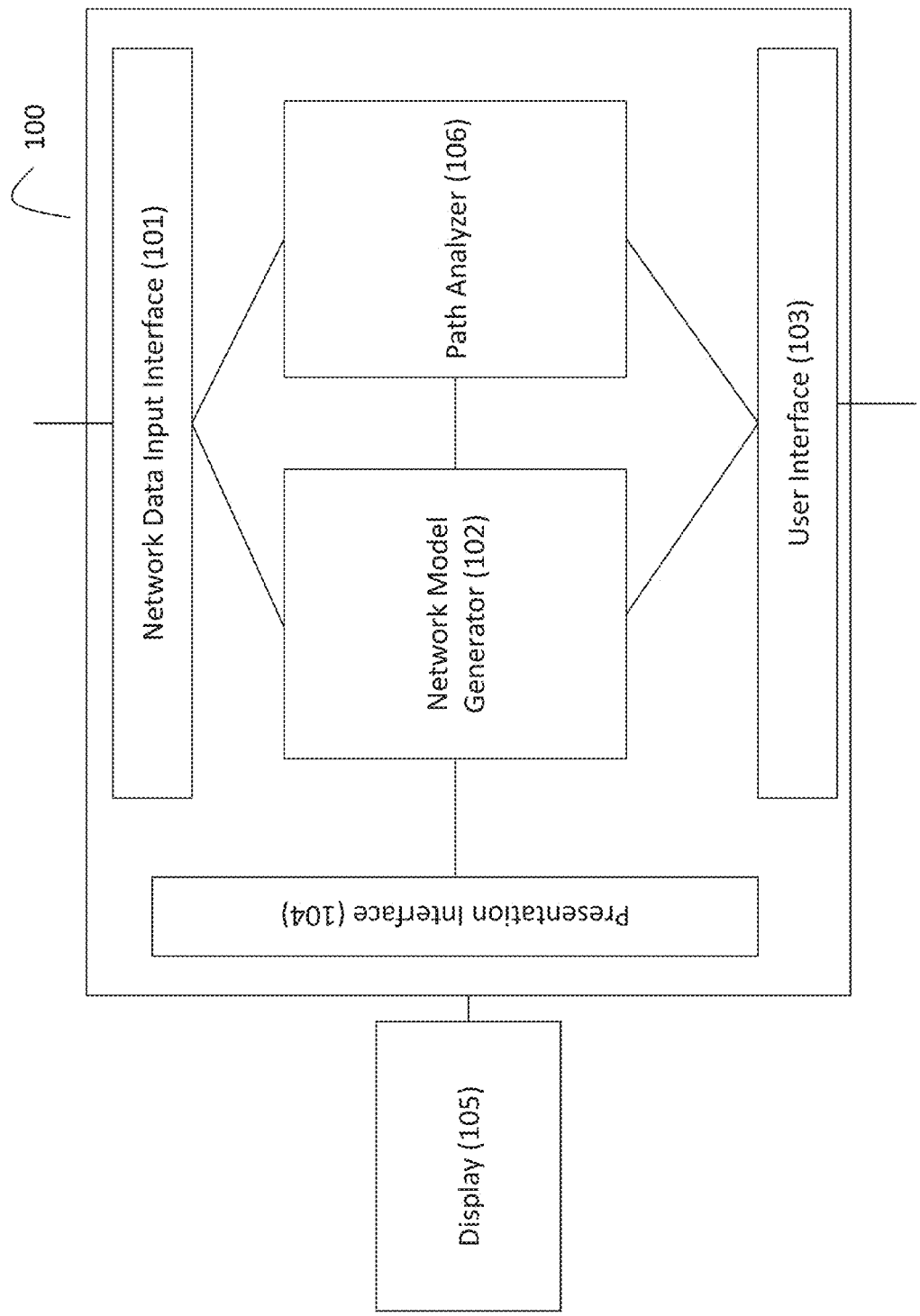
FIG. 1 illustrates a generalized functional block diagram of a network analyzer in accordance with certain embodiments of the presently disclosed subject matter.

In the following detailed description, numerous specific details are set forth in order to provide a thorough understanding of the invention. However, it will be understood by those skilled in the art, that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "assigning", "generating", "presenting" or the like, refer to the action and/or processes of a computer that manipulate and/or transform data represented as physical, such as electronic, quantities and/or data representing the physical objects.

The term "computer" should be expansively construed to cover any kind of electronic device with data processing capabilities (including the network analyzer detailed in the currently presented subject matter). The operations in accordance with the teachings herein can be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages can be used to implement the teachings of the inventions as described herein.

The references cited in the background teach many principles of topology network modeling and analyses that are applicable to the presently disclosed subject matter. Therefore the full contents of these publications are incorporated by reference herein where appropriate for appropriate teachings of additional or alternative details, features and/or technical background.

Bearing the above in mind, attention is drawn to FIG. 1 illustrating a schematic functional block diagram of a network analyzer in accordance with certain embodiments of the presently disclosed subject matter.

The network analyzer 100 comprises a network data input interface 101 configured to obtain device and routing information (e.g. physical and virtual routers, routing tables, interface and VLAN definitions, subnet information, network address translation, policy based routing, MPLS definitions etc.) from different network elements. The input interface 101 is operatively coupled to a topology network model generator 102 configured to analyze the obtained device and routing information and to generate a topology network model specifying the network elements (e.g. firewalls, routers, load balancers, proxies and other network elements) and the connections between them. The generator can further generate a graph representing the topology network model and further present the generated graph at a display 105 via a presentation interface 104.

In the following description any network element capable of providing routing information is referred to hereinafter as a router. A router with available routing information is referred to hereinafter as a monitored router; otherwise a router is referred to as an unmonitored router. An unmonitored router can be discovered automatically, for example through a Next-Hop that is seen in a monitored router and does not lead to any other monitored router.

The input interface 101 can be further operable to obtain other than routing information related to the network (e.g. usage statistics, etc.), while the topology network model generator can be operable to process such information and apply additional attributes to the graph.

Non-limiting examples of the automatically generated graphs representing topology network models of an exemplary network are illustrated in FIGS. 2a-2d.

Figure 2A:
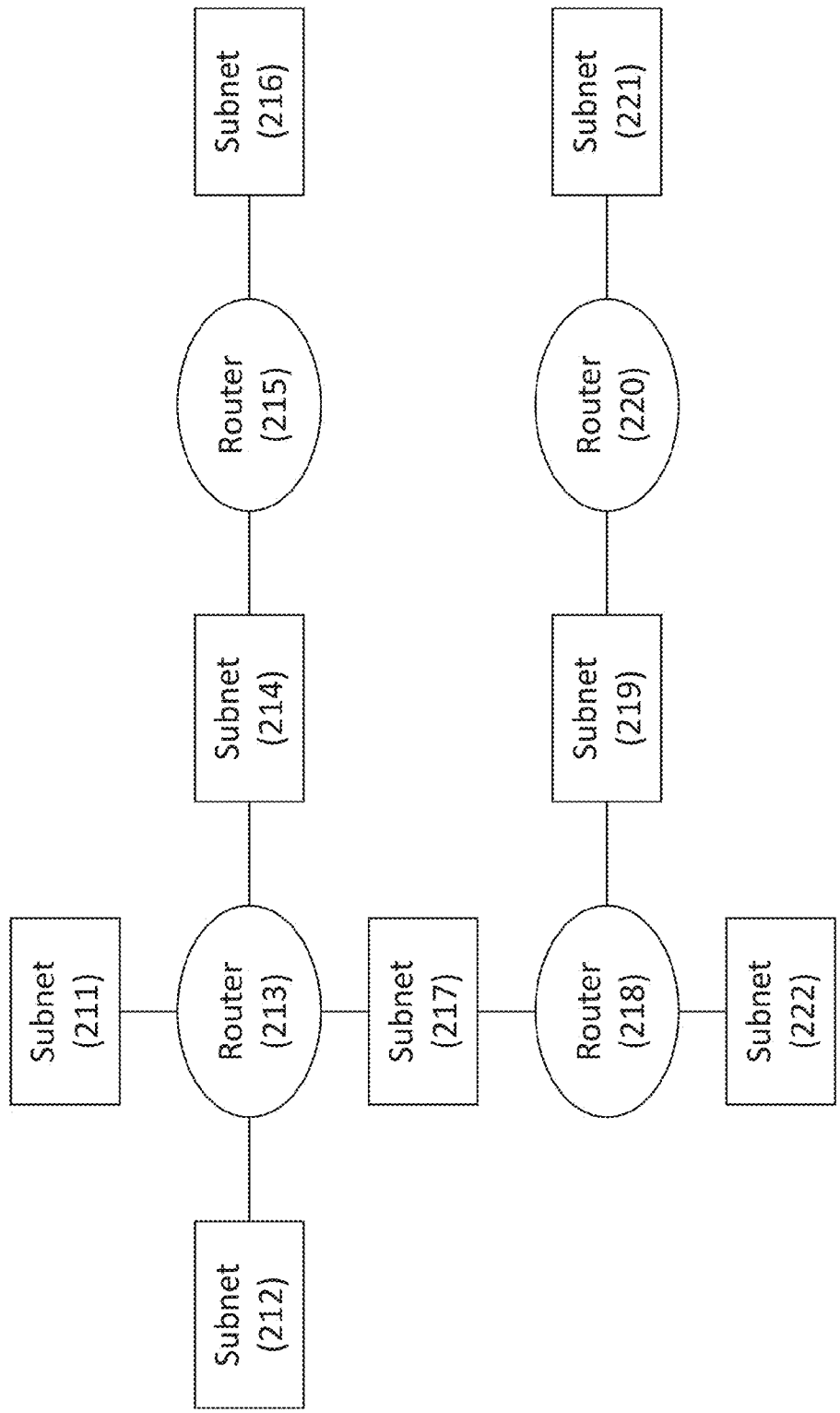
FIGS. 2a-2d illustrate non-limiting examples of the automatically generated graphs representing topology network models of an exemplary network.
Figure 2B:
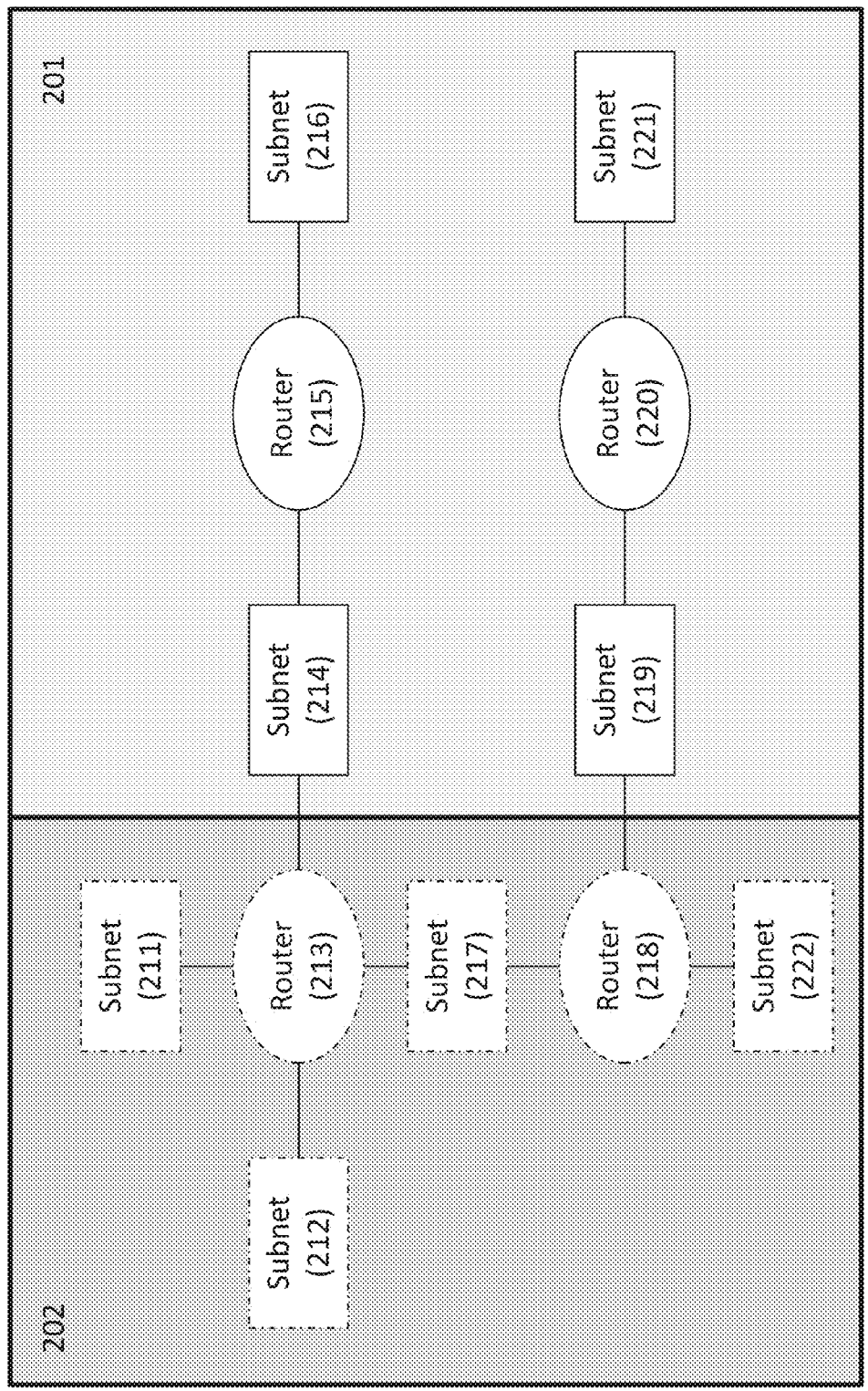

The exemplary network comprises routers 213, 215, 218 and 220 and respective sub-networks 211, 212, 214, 216, 217, 219, 221 and 222. FIG. 2a illustrates the case when all routers in the exemplary network are monitored. FIG. 2b illustrates the generated graph in a case when the network analyzer 100 has obtained routing information only about routers 215 and 220, while the routers 213 and 218 are unmonitored. Accordingly, part 201 of the illustrated network is monitored and routing information about part 202 of the network is unknown to the system.

One or more unmonitored routers and one or more respective subnets that these unmonitored routers lead to can be automatically discovered based on the obtained routing information. Such unmonitored routers and subnets can be represented in a topology network model and a respective graph as a cloud. A router is considered connected to a cloud (also referred to hereinafter as leading to the cloud), if the router is directly connected to a subnet that, in turn, is directly connected to the cloud. An address space of a cloud is defined as a plurality of addresses that are routed into the cloud by all routers connected to it.

Figure 2C:
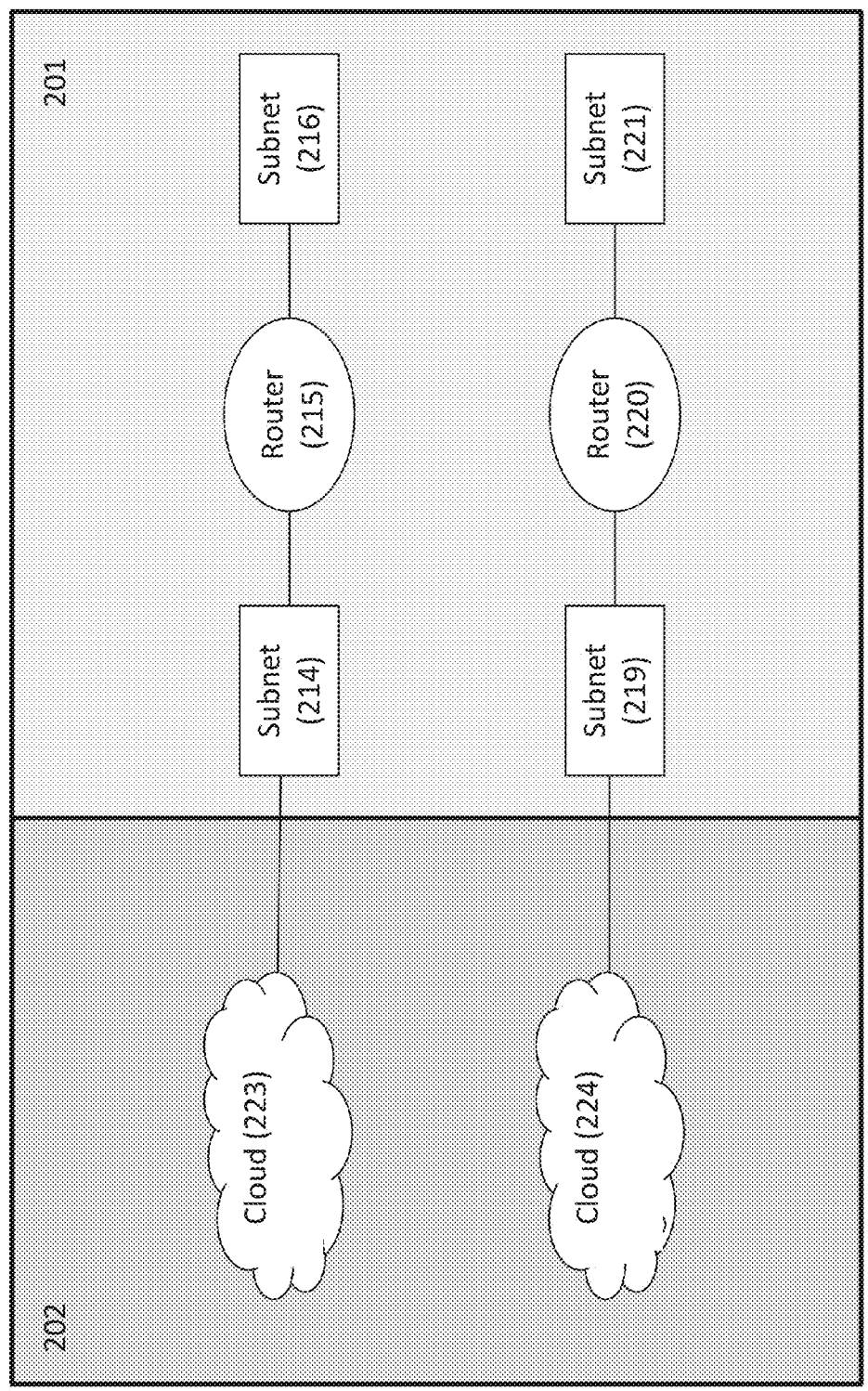

By way of non-limiting example, cloud 223 illustrated in FIG. 2c represents the unmonitored router 213 and subnets 211, 212, 217; cloud 224 illustrated in FIG. 2c represents the unmonitored router 218 and subnets 217 and 222. A topology network model comprising one or more clouds along with monitored routers and respective subnets is referred to hereinafter as a partial topology network model.

It is noted that the Internet when seen from the perspective of an internal enterprise network can be considered as a non-limiting example of a cloud.

Figure 2D:
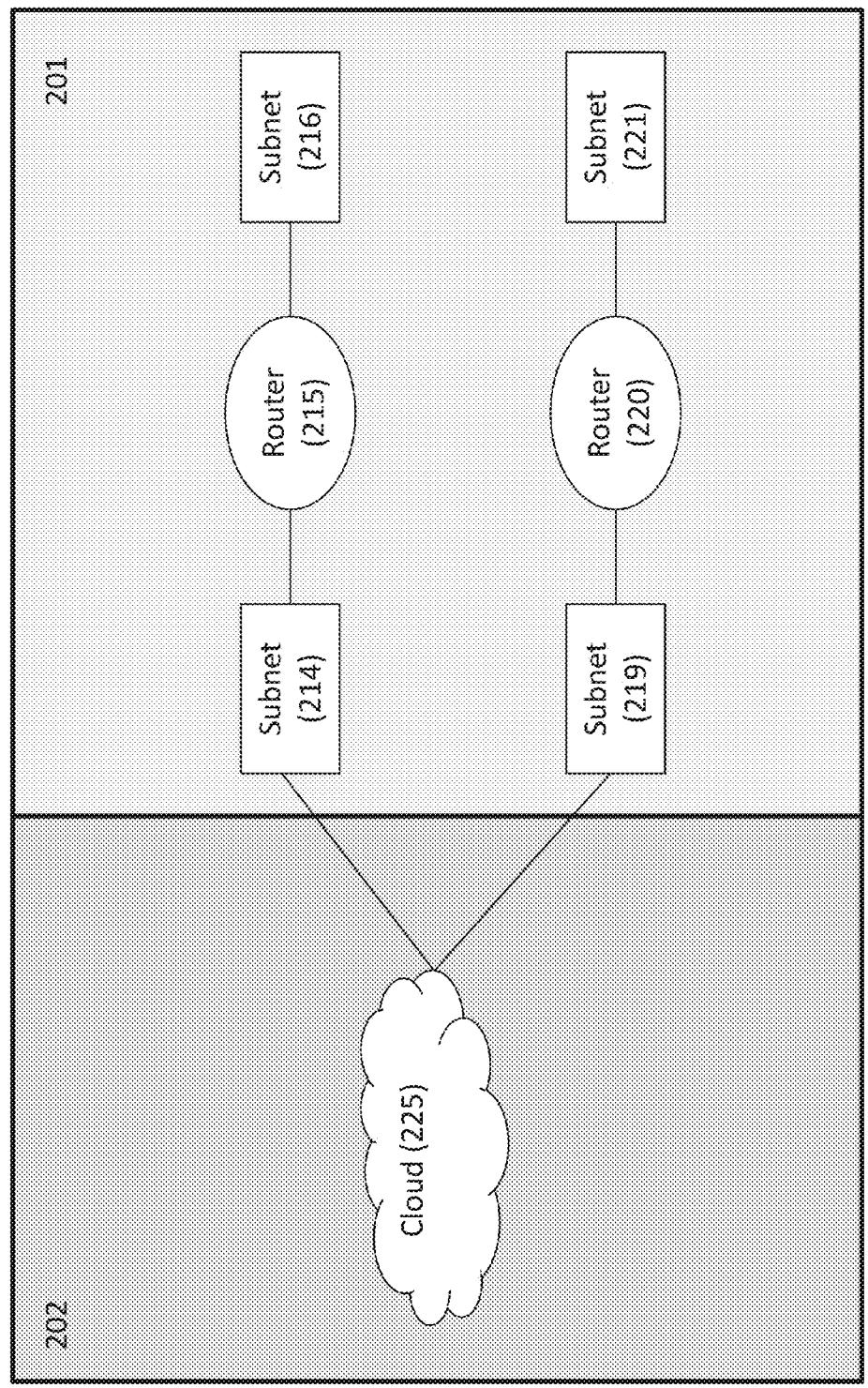

The graph illustrated in FIG. 2c is not fully connected. This may occur due to some missing unmonitored routers or for other reasons. The network analyzer 100 is operable to join certain clouds to create a fully connected graph. By way of non-limiting example, cloud 225 illustrated in FIG. 2d is a result of joining the clouds 223 and 224. The clouds can be joined fully automatically, manually, or automatically responsive to a user's input.

Referring back to FIG. 1, the topology network model generator 102 is further operable to automatically update the generated graph in accordance with obtained routing information. By way of non-limiting example, the updates can be provided based on periodically reading interface definitions, routing tables and/or, optionally, other routing information) from the monitored routers. Changes can include a new/deleted router, interface, VLAN, network or cloud. The changes can be related to connectivity of network elements, for example, two routers that were previously disconnected can become connected through a shared subnet.

The network analyzer 100 further comprises a user interface 103 operable to enable adjusting the automatically generated graph in a manual manner. For example, it can be useful as a means of correction and improving the automatically generated graph.

By way of non-limiting example, the user can be enabled to perform the following manual adjustments:
Separate/connect a subnet from/to a router (through an interface)
Join/separate clouds to/from each-other
Manually add/delete subnets to clouds
Specify subnet/cloud attributes such as, for example, the security zone
(DMZ, Internal, External etc.), a name, a color etc.
Manually add routers to the graph (that were not learned automatically from the network)
Add or edit routing information for routers on the graph
Graphically reposition elements of the graph In accordance with certain embodiments of the currently presented subject matter, the topology network model generator 102 is further operable to process data obtained from the interfaces 101 and 103 (e.g. routing information and/or other information from the physical network, user configuration information, information from 3$^{rd}$ parties, etc.) and to maintain manual user adjustments whilst automatically updating the graph from routing information. The generator 102 is further configured to enable identification of multiple revisions of the same element in the graph.

By way of non-limiting example, in a case when the user manually joins two clouds, one of the clouds can be modified to contain additional subnets (e.g. because of a configuration change on some router(s)). As will be further detailed with reference to FIG. 3, the topology network model generator is configured to associate the modified cloud with the original one, and maintain the user configuration that specifies the two clouds as joined. Thus the network analyzer is capable to identify a previous version of the cloud with the new one, even though they are different.

By way of another non-limiting example, the user can manually disconnect a subnet from one of the routers that leads to it, Router A; later a newly added router can be also connected to this subnet. The topology network model generator is configured to associate the modified subnet with the original one and maintain the user configuration that specifies that it is not connected to Router A.

Figure 3:
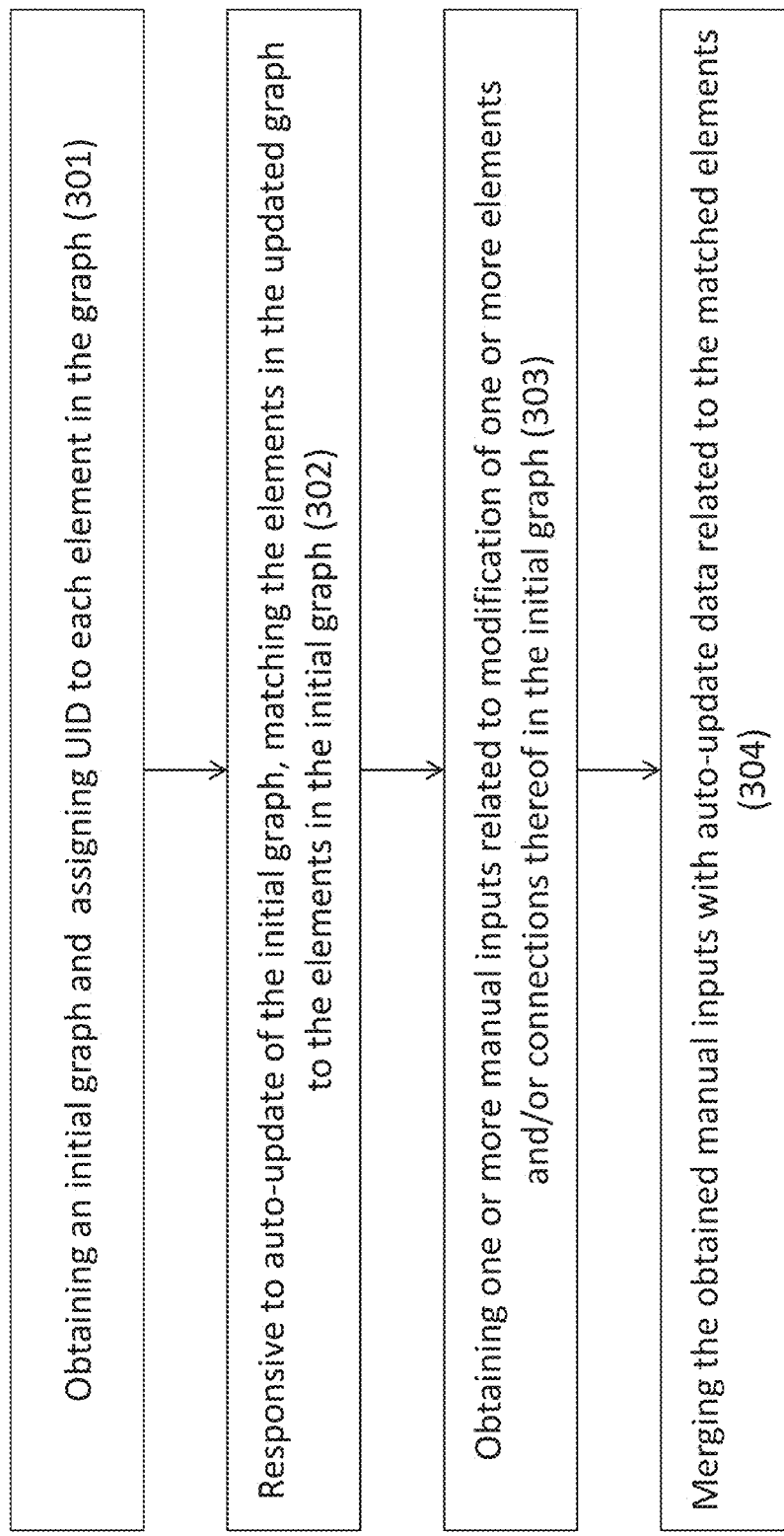
FIG. 3 illustrates a generalized flow chart of generating an updated topology network model based on auto-update data received from a network and inputs received from other sources.

FIG. 3 illustrates a generalized flow chart of generating an updated topology network model based on auto-update data received from the network and other (e.g. manual) inputs.

For purpose of illustration only, the following description is provided with respect to the manual inputs provided by a user. Those skilled in the art will readily appreciate that the teachings of the present invention are applicable in a similar manner to any appropriate input data other than auto-update data received from the network.

Upon obtaining an initial graph presenting a model of the network, the topology network model generator assigns (301) a unique identifier (UID) to each element in the graph (or other representation of the topology network model).

The UID can be automatically generated as follows:
every router is given a UID when it is defined in the system;
UID of a given interface is based on UID of a respective router and physical interface identifier (e.g. IP, Name or MAC address);
UID of a given subnet is based on a combination of the UIDs of the interfaces that lead to the subnet;
UID of a given single cloud is based on a combination of the leading subnet's UID and the next-hop in the cloud;
UID of a given joined cloud is based on a combination of the UIDs of the participating clouds.

In accordance with certain embodiments of the currently presented subject matter, assigning the UIDs is provided in a certain order—first to elements that can be identified accurately (e.g. routers), and then to elements that depend on them. For example:
as cloud UID depends on the subnet UIDs that lead to it, subnet UIDs are assigned first;
as subnet UID depends on the interface UIDs that lead to it, interface UIDs are assigned first.

The topology network model generator auto-updates the initial graph in accordance with information received via the interface 101. Responsive to the auto-update, the topology network model generator matches (302) the elements in the updated graph to the elements in the initial graph to give yield to the matched elements. The matched elements comprise elements with identical UIDs and/or elements comprising one or more elements that are connected to elements with identical UIDs.

The matching of elements with the same UID include, for example:
Routers and interfaces that already existed in the previous version of the graph
Subnets that are still connected to the same set of interfaces
Clouds that are still connected to the same subnets with the same next-hops For elements that have no identical counterpart in the previous graph version the matching is based on topological similarity, for example:
Subnets that are still connected to one or more previous interfaces
Clouds that are still connected to one or more previous subnets Number of previous connections and/or connection specifications can be used as a configurable threshold defining topological similarity of the network elements. An element is considered as a new one if a topological difference exceeds a predefined threshold.

When the topology network model analyzer obtains (303) through the interface 103 one or more manual inputs related to modification of one or more network elements and/or connections thereof in the initial graph, it further applies the manual modifications (e.g. disconnected subnets, connected clouds, added/removed subnets to clouds, additional attributes of subnets/clouds) to matched elements.

The topology network model analyzer further merges (304) the obtained manual inputs with auto-update data related to the matched elements, thereby enabling presentation of the graph updated based on data received from the physical network and on the manual inputs.

Figure 4A:
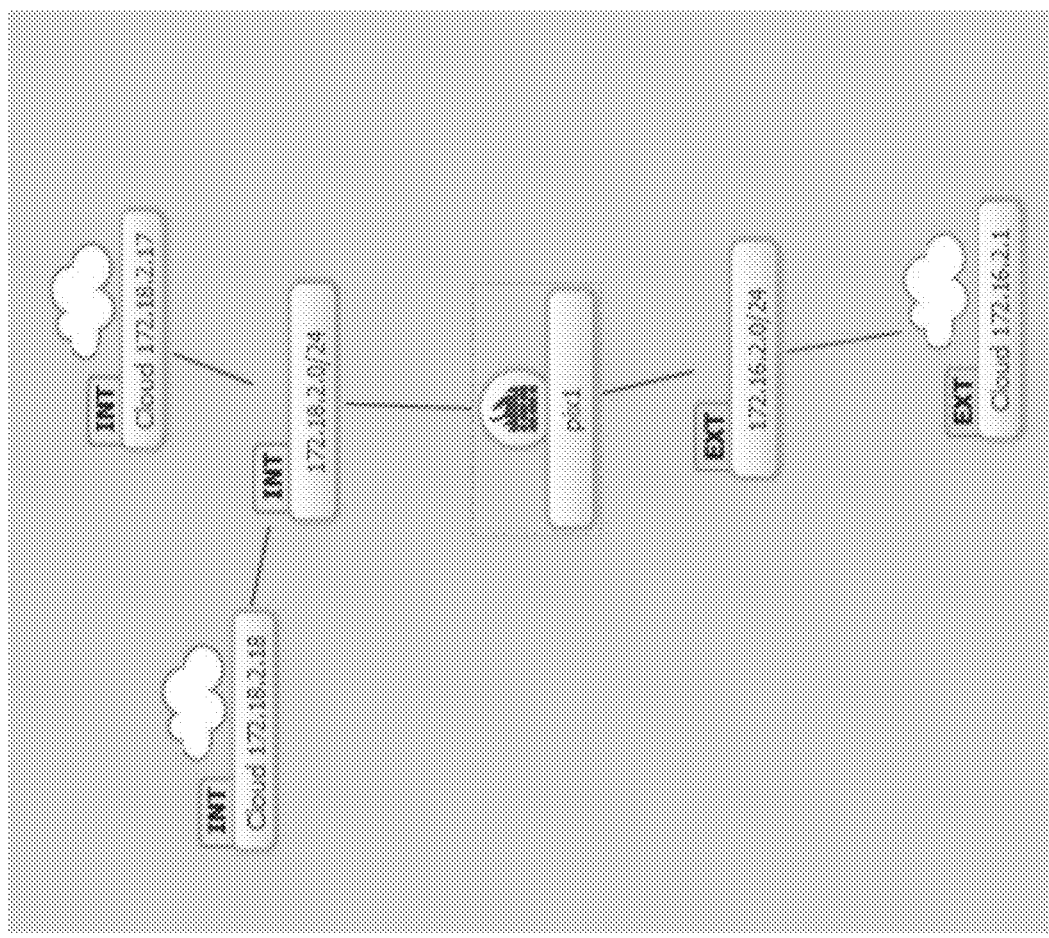
Figure 4B:
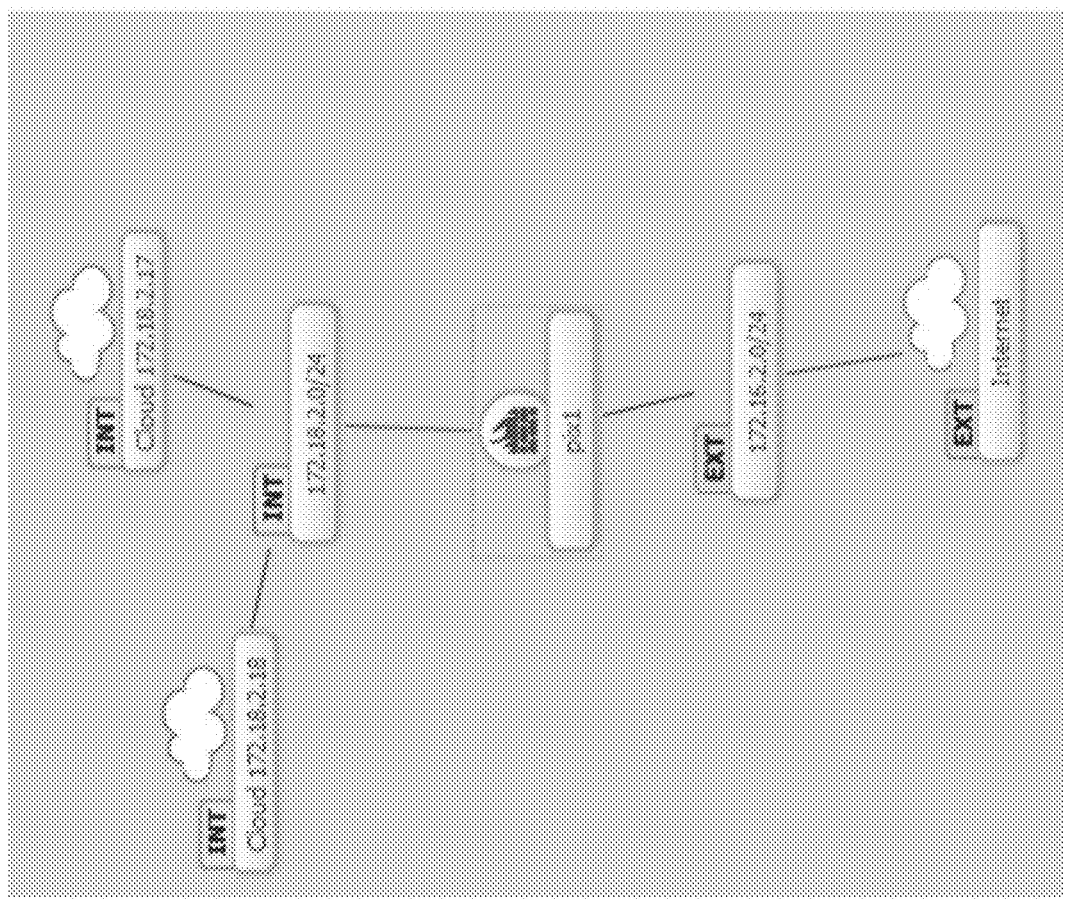
Figure 4C:
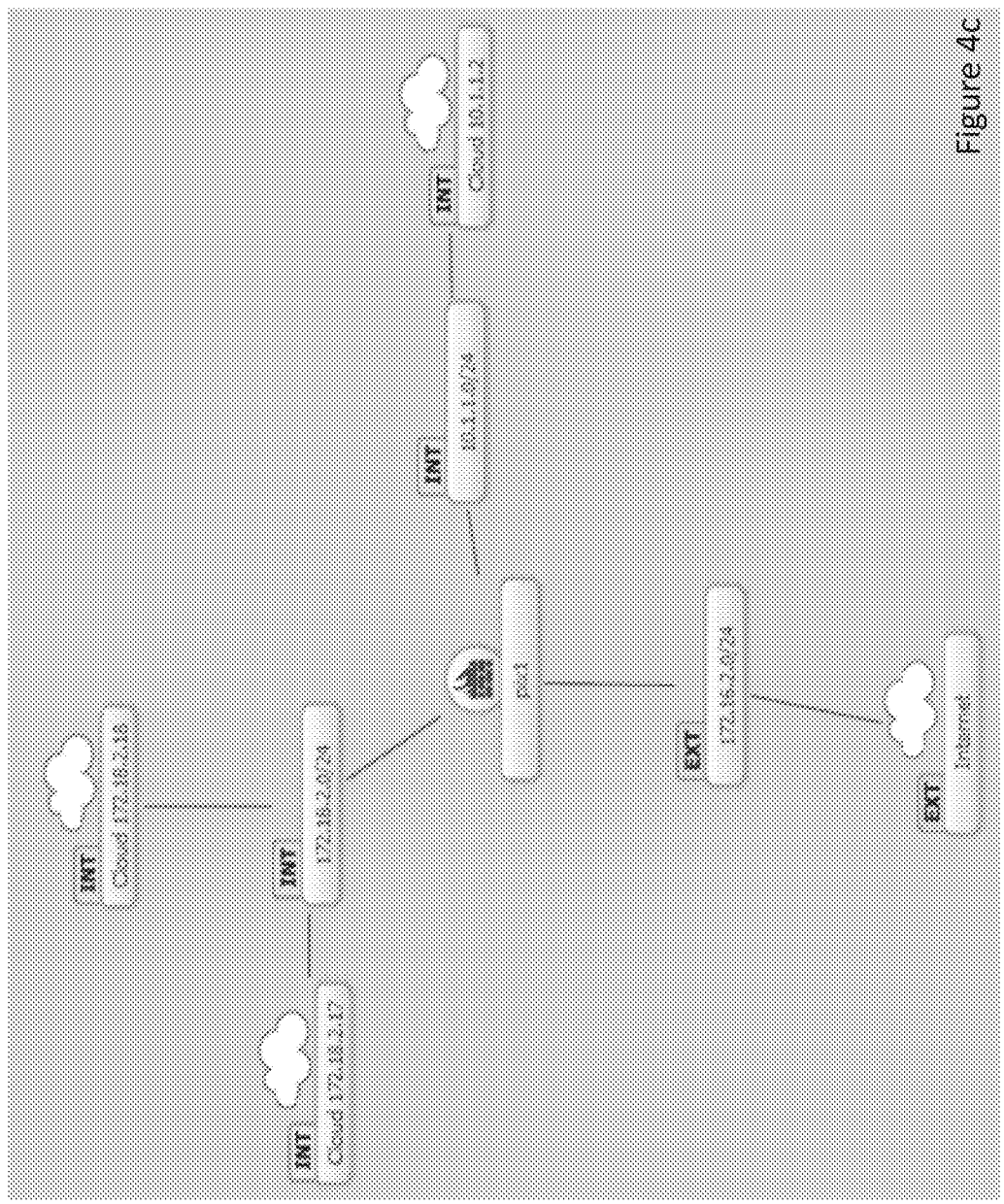

FIGS. 4a-4e illustrate non-limiting examples of screenshots corresponding to the method detailed with reference to FIG. 3. The screenshot in FIG. 4a illustrates a graph comprising a single firewall with two interfaces and three clouds. This graph is generated automatically from the firewall's routing table. The screenshot in FIG. 4b illustrates user's customization of the external cloud in FIG. 4a and renaming it as "Internet". The screenshot in FIG. 4c illustrates an auto-updated graph with a new interface added to the firewall and connecting the firewall to a new subnet and cloud. Note that the previous custom setting from FIG. 4b has been maintained. The screenshot in FIG. 4d illustrates customization of the newly added subnet and cloud by the user and setting their type and name to 'DMZ'. The screenshot in FIG. 4e illustrates a further auto-updated graph with added new firewall "pix2". The user settings from FIGS. 4b and 4d are maintained after the update. Thus, as illustrated in FIGS. 4a-4e, the user settings are maintained even though the network topology has been significantly modified.

Among advantages of certain embodiments of the currently presented subject matter is capability of uniquely identifying elements on the multiple revisions of the graph thus reflecting variations in network configurations. Among further advantages is the capability of enabling co-existence of user's corrections with automatic updates in the same network model. The created hybrid graph model can be generated and updated automatically to reflect the physical (layer-3) network topology, while also allowing the user to correct it manually.

Referring back to FIG. 1, the network analyzer further comprises a path analyzer 106 operatively coupled to the topology network model generator 102. In accordance with certain embodiments of the currently presented subject matter, the path analyzer 106 is configured to provide path analysis on topology network models including path analyses on partial models.

By way of non-limiting example, path analysis can be used to determine business connectivity. For example, it can be used to determine the connectivity status of distributed applications. The user can define the applications that are needed for business, the servers they consist of and the required connections between them. For example, a CRM system may consist of a web server connected to an application server which is connected to a database. The network analyzer can use the topology network model to automatically determine the possible network routes (paths) per required connection, analyze the security policies on each security device on the path and determine whether the connection is in place or blocked. Further, the network analyzer can be configured to define and display the connectivity status (e.g. connected, blocked, partially blocked, etc.) per application.

The network analyzer can further determine the status of inter-zone connectivity policies. Path analysis can be used to verify whether connections from a certain zone to another one are properly restricted according to the inter-zone connectivity policies. The network analyzer can use the topology network model to automatically determine the possible network routes (paths) per restricted connection, analyze the security policies on each security device on the path and determine whether the connection is in place or blocked.

Those versed in the art will readily appreciate that the teachings of the presently disclosed subject matter are not bound by the system illustrated in FIG. 1, and that equivalent and/or modified functionality can be consolidated or divided in another manner and can be implemented in any appropriate combination of software, firmware and hardware. The network analyzer and/or blocks thereof can be implemented on one or more computers comprising a processor operatively coupled to a memory, both configured to operate as disclosed in the currently presented subject matter.

Figure 5:
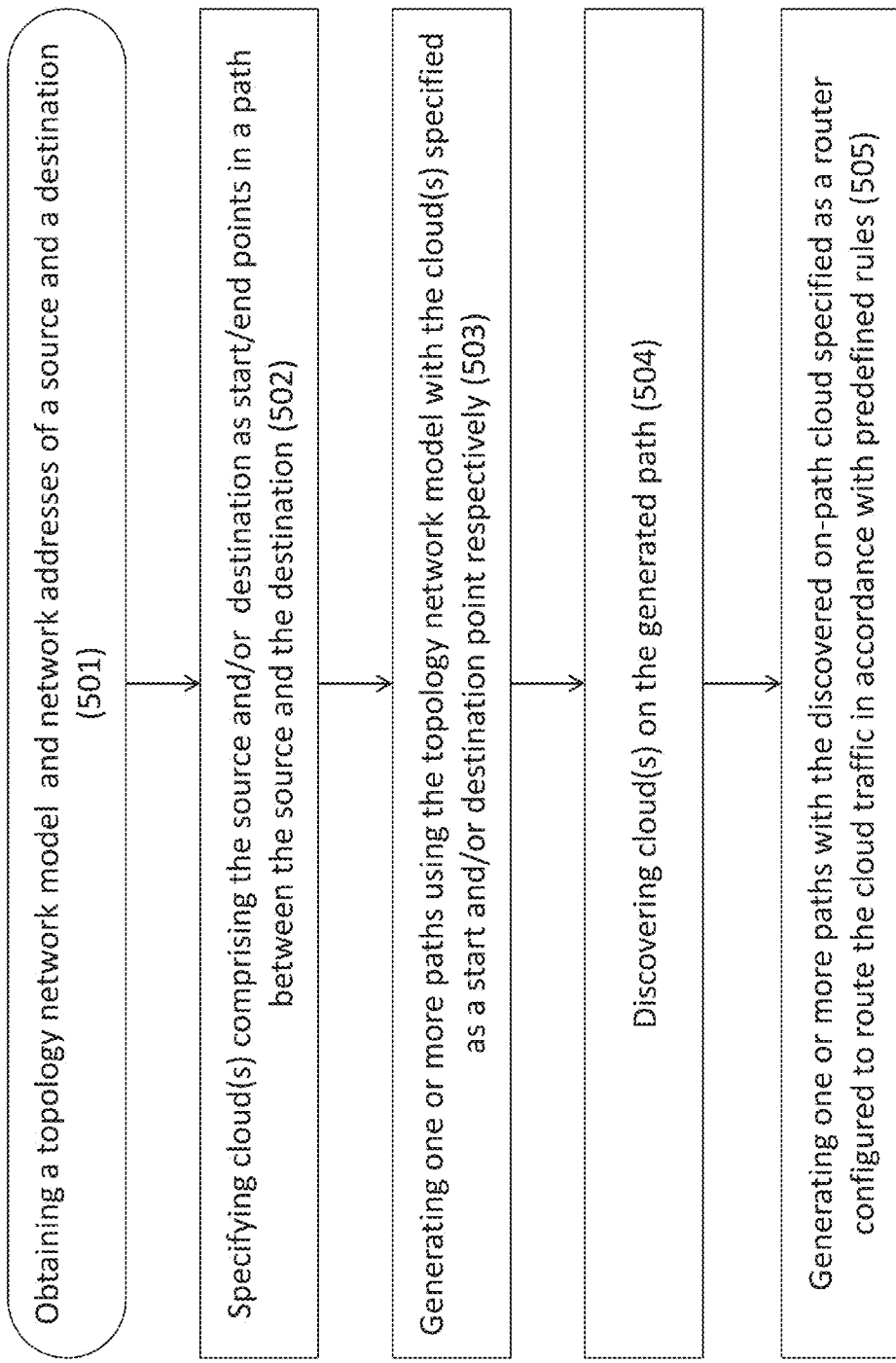
FIG. 5 illustrates a generalized flow chart of path generating in accordance with certain embodiments of the presently disclosed subject matter.

Referring to FIG. 5, there is illustrated a generalized flow chart of path generating in accordance with certain embodiments of the presently disclosed subject matter.

Upon obtaining (501) network addresses of desired source and destination, the path analyzer 106 generates respective one or more paths therebetween using a topology network model. The topology network model specifies, at least, routers, subnets, clouds and connections thereof, and can be generated by the topology network model generator 102 and/or received from an external source. A path consists of one or more source points, one or more routing points (a monitored router, a cloud etc.) and one or more destination points.

The path analyzer defines if the desired source and/or destination are located in cloud(s) in accordance with the following criteria: a network element characterized by a certain network address is considered as located in a cloud if any of the routers leading to this cloud comprise the routing entry leading to the cloud and corresponding to the certain network address. As will be further detailed with reference to FIG. 6a, such a network element can be considered as located in the cloud only if none of the monitored routers comprises a more specific (smaller subnet) routing entry not leading to this cloud and corresponding to this certain network address.

The path analyzer discovers the cloud(s), if any, comprising the source and/or the destination. If a cloud comprising a source and/or a cloud comprising a destination are discovered, the path analyzer specifies (502) the discovered cloud(s) as respective end point(s) of the desired path. In other words, a cloud is defined as source point for the path if the source network address intersects with the cloud's address space defined as all traffic that is routed into the cloud. Likewise, a cloud is defined as a destination point for the path if the destination network address intersects with the cloud's address space. Optionally, additional logic can be used—for example, matching a source point will also require matching a certain label provided by the user and assigned to the cloud as a custom attribute. Additionally or alternatively, the user can select the source point manually on the graph.

The path analyzer further generates (503) one or more paths between the source and the destination based on the topology network model with the discovered cloud(s) as source and/or destination point respectively.

The paths can be generated upon specifying end points (i.e. source and/or destination points), Alternatively, the path can be generated upon specifying at least one of the end points. A path is generated in a continuous manner so that the network elements in the path lead to one another. The path can be generated in accordance with a traffic block characterized by source and destination addresses. The traffic block can be modified by elements on the path. For example, the initial traffic block can be split into multiple blocks by routing that leads to two or more paths, traffic can be translated by NAT rules, traffic can be partially blocked by security policies.

Upon specifying at least one end point of a desired path, the path can be generated using appropriate path generation methods known in the art for full topology network models, e.g. models based on routing information available for each network element (e.g. a method disclosed in the article "On Static Reachability Analysis of IP Networks" by Xie, G. G. et al. published in INFOCOM 2005. 24th Annual Joint Conference of the IEEE Computer and Communications Societies. Proceedings IEEE, Issue Date: 13-17 Mar. 2005).

Further, one or more on-path clouds can be discovered (504) when generating the path between the end points. The path analyzer specifies the discovered one or more on-path clouds as routers configured to route the cloud traffic in accordance with predefined rules (505):

inbound routing to a cloud specified in accordance with routing information obtained from monitored routers;

outbound routing from a cloud routes all addresses routed into the cloud to all routers that are connected to it through subnets.

The path analyzer further presents one or more generated paths to a user. The user can be enabled to select a desired path via the user interface 103. Optionally, the path analyzer can automatically select among the generated paths one or more paths to be presented to the user. Such selection can be provided in accordance with predefined criteria.

The process of path generating can be further optimized to reduce errors when specifying source/destination points of the path and/or to reduce excessive paths caused by clouds routing into all connected routers when specified as on-path routers. The optimization can be provided during the path generation and/or before presenting the generated paths.

In accordance with certain embodiments of the presently disclosed subject matter, the optimization can include at least one of the following:

using routing precedence;
using symmetric routing considerations;
using loop detection;
cloud customization using additional routing information.

The path analyzer can obtain necessary for optimization data from the network topology model generator 102 and/or from an external source.

Topology network models in FIGS. 6a-6b illustrate non-limiting examples of path generation optimization.

Errors when specifying source/destination points of the path can be reduced by using routing precedence. In the non-limiting example of the network topology model illustrated in FIG. 6a, the default route of a router 600 leading to a cloud 603 includes all IP, thus the address space of the cloud 603 is all IPs. When generating a path with source network address 192.168.1.1, the path analyzer can consider that the desired source is located in the cloud 603, and specify, erroneously, the cloud 603 as a source point of the path. Thus, when defining if a desired source and/or destination are located in a cloud, the interception of the desired address shall be analyzed with regard to a part of the cloud address space with excluded addresses of known subnets. The path analyzer can obtain respective data from the network topology model generator 102 and/or from an external source.

Excessive paths between the source and the destination can be reduced using symmetric routing considerations. In the non-limiting example of network topology model illustrated in FIG. 6b, a router 610 has a route 10.0.1.0/24 to a cloud 615, and a router 611 has a route 10.0.2.0/24 to the cloud 615. Both routers are directly connected to a subnet 612 having address 192.168.1.0/24.

When generating a path with source 10.0.1.1 and destination 192.168.1.1, the system will suggest two paths from the cloud through each of the routers to the subnet 612. Assuming that routing is symmetrical, one of these paths can be eliminated.

Alternatively or additionally, excessive paths between the source and the destination can be reduced using loop detection. If traffic is routed from a cloud to a router and the router routes the traffic back to the cloud, then this loop can be ignored.

Path analysis can yield in at least one of the following results:

information indicative if a path exist or not;
information indicative if traffic allowed or not (based on policies);
one or more relevant paths;
relevant routers, device interfaces and routing entries;
relevant NAT rules;
relevant security policies and rules;
traffic relevant to each path, router, interface etc. (before or after security policy considerations), etc.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which can be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method to analyze connectivity between a source and a destination through the operating of a network analyzer comprising a processor operatively coupled to a memory, the method comprising:

upon obtaining in the memory a partial topological network model comprising at least one cloud comprising at least one unmonitored router, the cloud connected to one or more monitored routers and characterized by a cloud address space defined as a plurality of addresses that are routed into the cloud by all routers connected thereto, specifying at least one pair of end points of one or more paths between the source characterized by one or more source network addresses and the destination characterized by one or more destination network addresses, wherein the processor specifies the cloud as a source point of the one or more paths if at least one source network address belongs to the cloud address space and the processor specifies the cloud as a destination point of the one or more paths between the source and the destination if at least one destination network address belongs to the cloud address space; and generating by the processor the one or more paths between the specified at least one pair of end points;

wherein, during the step of generating the one or more paths, discovering by the processor at least one on-path cloud on at least one of the paths being generated, the on-path cloud comprising at least one unmonitored router and being a joint of two or more monitored parts of the network; and specifying, by the processor, the discovered at least one on-path cloud as an on-path router configured to route traffic between the two or more monitored parts of the network, wherein inbound routing to the on-path cloud is specified in accordance with routing information obtained from monitored routers; and outbound routing from the at least one on-path cloud is specified to route all addresses routed into the at least one on-path cloud to all connected monitored routers.

2. The method of claim 1 further comprising presenting, using a display operatively coupled to the network analyzer, the generated one or more paths to a user, and enabling the user to select one or more desired paths.

3. The method of claim 1 further comprising optimizing the path generation using at least one element of the group constituted by routing precedence; symmetric routing considerations; loop detection; cloud customization using additional routing information.

4. The method of claim 1 further comprising determining two or more network elements corresponding to a business application, and defining connectivity status of the application using the paths generated between the determined network elements.

5. The method of claim 1 further comprising determining two or more zones, and defining a status of inter-zone connectivity policies using the paths generated between the determined zones.

6. A network analyzer capable of analyzing connectivity between a source and a destination characterized, respectively, by one or more source network addresses and one or more destination network addresses, the network analyzer comprising a processor operatively coupled to a memory, wherein the processor is configured to:

obtain from the memory a partial topological network model comprising at least one cloud comprising at least one unmonitored router, the cloud connected to one or more monitored routers and characterized by a cloud address space defined as a plurality of addresses that are routed into the cloud by all routers connected thereto;

upon specifying at least one pair of end points of one or more paths between the source and the destination, wherein the processor specifies the cloud as a source point of the one or more paths if at least one source network address belongs to the cloud address space and the processor specifies the cloud as a destination point of the one or more paths between the source and the destination if at least one destination network address belongs to the cloud address space;

generate the one or more paths between the specified at least one pair of the end points;

during generating the one or more paths, discover at least one on-path cloud on at least one of the paths being generated, the on-path cloud comprising at least one unmonitored router and being a joint of two or more monitored parts of the network; and specify the discovered at least one on-path cloud as an on-path router configured to route between the two or more monitored parts of the network, wherein inbound routing to the on-path cloud is specified in accordance with routing information obtained from monitored routers; and outboard routing from the at least one on-path cloud is specified to route all addresses routed into the at least one on-path cloud to all connected monitored routers.

7. The analyzer of claim 6 further comprising a display and an input device operatively coupled to the processor, the display configured to present the generated one or more paths to a user, and the input device is configured to enable the user to select one or more desired paths.

8. The analyzer of claim 6 wherein the processor is further configured to optimize the path generation using at least one element of the group constituted by routing precedence; symmetric routing considerations; loop detection; cloud customization using additional routing information.

9. A computer program product embodied on a non-transitory computer readable medium and comprising computer program code means for performing all the steps of claim 1 when run on a computer.

* * * * *